United States Patent Office 2,711,494
Patented June 21, 1955

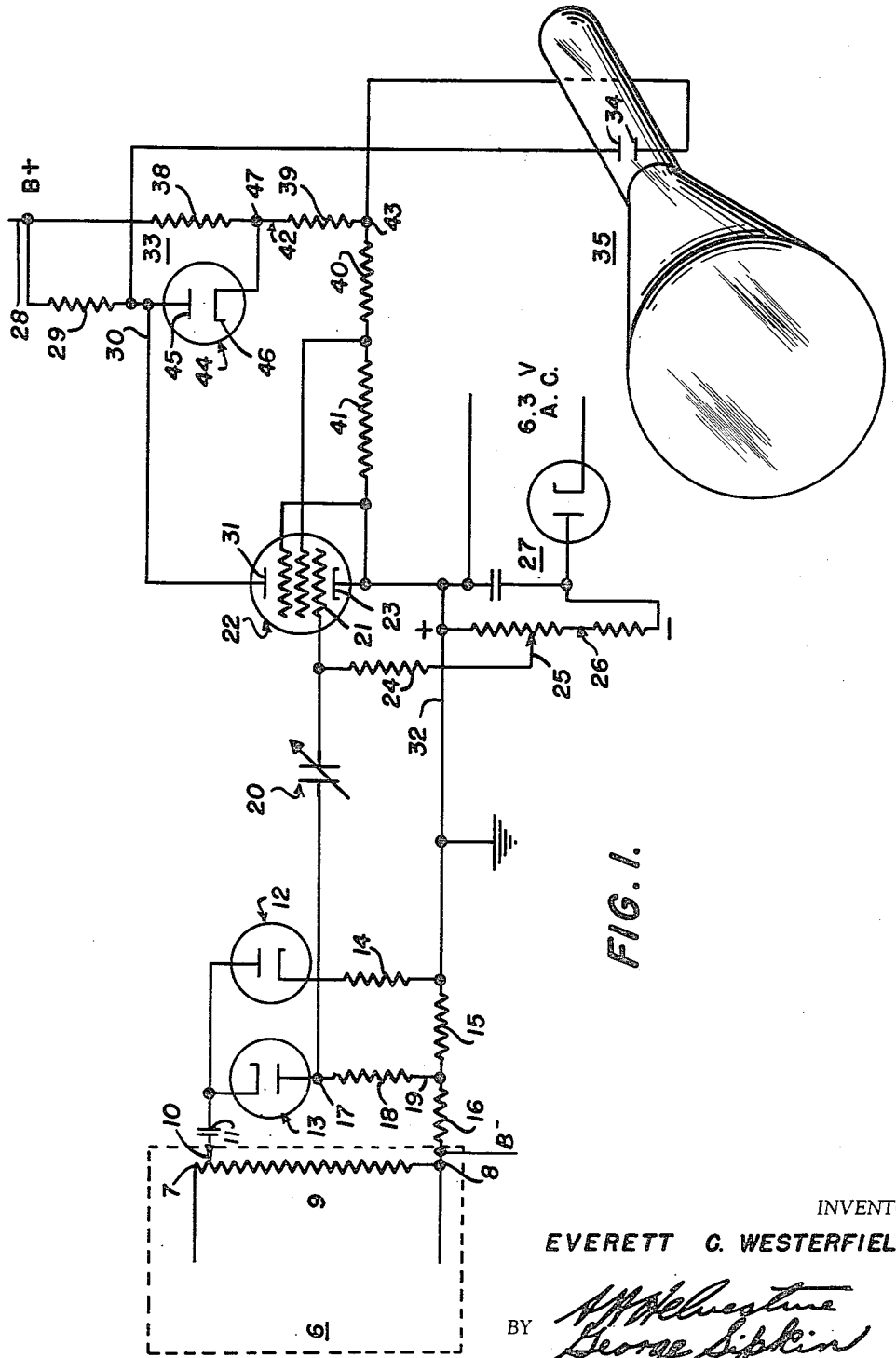

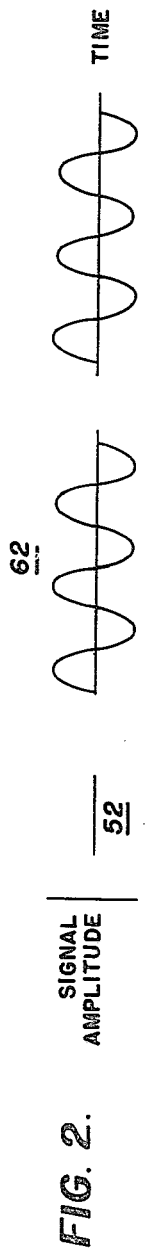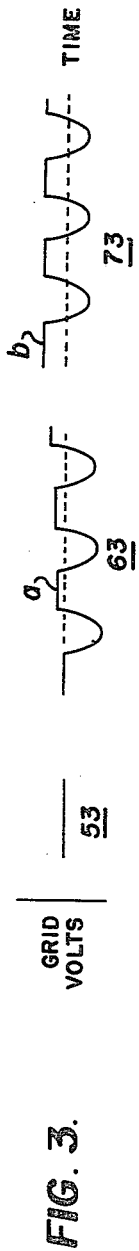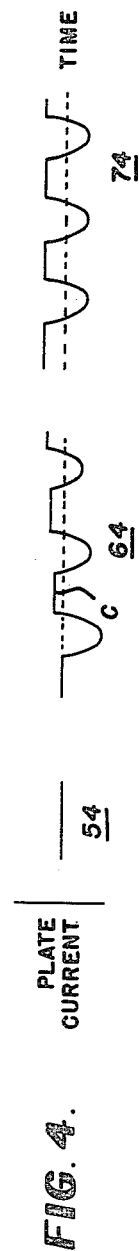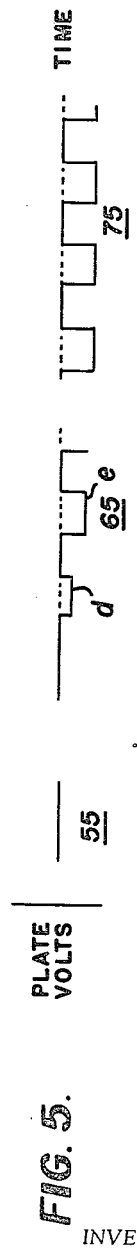

2,711,494
SIGNAL-AVERAGING ELECTRONIC CIRCUIT

Everett C. Westerfield, San Diego, Calif., assignor to the United States of America as represented by the Secretary of the Navy Application October 16, 1951, Serial No. 251,591

14 Claims. (Cl. 315—29)

(Granted under Title 35, U. S. Code (1952), sec. 266)

The invention described herein may be manufactured and used by or for the Government of the United States of America for governmental purposes without the payment of any royalties thereon or therefor.

This invention relates to an electronic circuit capable of producing an output signal or indication which is dependent on an average value of an incoming or input signal, and more particularly relates to an electronic circuit of the character described capable of providing a quantitative indication of a magnitude of the incoming signal a short-time after the reception of the signal. Such an indication is desirable in certain sonic applications.

An object of the invention is to provide an electronic circuit which comprises means that provides an intermediate electrical signal corresponding to the average of the waves of an incoming or input signal, and comprises a cathode ray tube that provides a visible trace indicative of such average.

In accordance with a preferred form of electronic circuit embodying the invention, the negative portions or loops of an input wave-signal are applied to a resistance-capacitance circuit having a large time-constant. A cyclic voltage from this R-C circuit is balanced against a settable constant voltage and the resultant is used to bias the control grid of an electronic tube to produce a varying voltage in the plate circuit of the tube. The plate output of the electronic tube is controlled, in part, by a clipper circuit in a manner such that positive excursions of plate voltage are eliminated. The output voltage will consist of lower excursions in response to intervals between the negative portions or loops of the input signal, and will be a function of the average signal strength of the input signal originally applied to the R-C circuit.

Objects, features and innovations of the invention, in addition to the foregoing, will be discernible from the following description of a preferred embodiment thereof. The description is to be taken in conjunction with the accompanying schematic drawing in which:

Fig. 1 is a wiring diagram of an electronic circuit embodying this invention; and Figs. 2, 3, 4, and 5 are curves representative of operating conditions of the circuit, the ordinates being a measure of amplitudes from different datum lines and the abscissae being time on a common base. Fig. 2 shows variations in input signals; and Figs. 3, 4, and 5, respectively, show variations in grid volts, plate current and plate voltage resulting from the input signals.

Referring to Fig. 1, reference numeral 6 represents a receiver which converts an incoming wave-signal into an amplified electrical signal across terminals 7 and 8 at the ends of an attenuator 9 of any suitable form. The incoming wave-signal may be sonic, radio or any other form. Receivers are well-known for receiving such a signal and passing it on as an electrical signal to an attenuator with substantially no distortion of wave form. Any desired portion of the electrical signal is tapped from the attenuator 9 by means of an adjustable arm 10. For purposes of identification, this signal is hereinafter referred to as an input signal or input wave-signal. Obviously, under the conditions described, this input wave-signal will be the full equivalent, except as to magnitude, of any signal that is applied to or picked up by the receiver 6. For purposes of more readily explaining the invention, it is assumed that the input wave-signal is sinusoidal. The sine-wave input signal, across the arm 10 and the lower terminal 8, is applied, through blocking capacitor 11, to a pair of diode-rectifiers 12 and 13 connected oppositely so that each passes a half of the signal-wave which is different from that passed by the other. The rectifier 12 passes the positive half-cycles of the signal which flow in a circuit comprising resistors 14, 15, and 16 and the attenuator 10, and are dissipated therein. The rectifier 13 passes the negative half-cycles of the signal which flow in a circuit comprising the anode of the diode-rectifier 13, a conductor 17, a resistor 18, and a conductor 19. This rectified current-flow produces a voltage drop across the resistor 18 having a wave form corresponding to that of the negative loops of the input signal, so that the conductor 17 is generally negative with respect to the conductor 19 when a signal is being received.

The negative potential of the conductor 17 is applied, through a circuit comprising an adjustable capacitor 20, to the first or control grid 21 of a pentode amplifier tube 22, the cathode 23 of which is connected to the conductor 19 through the resistor 15. This negative potential is superimposed on a predetermined negative D. C. bias for the grid 21. This constant negative bias is applied to the grid through a leak resistor 24 which is of a higher order of resistance than that of any other resistor in the circuit. The constant grid-bias is adjustable and is obtained from a tap-arm 25 of a voltage-divider resistor 26 energized from any suitable source of D. C. voltage, shown as a smoothed rectifying circuit 27 fed by a low-voltage A. C. supply. The positive end of the voltage-divider 26 is electrically tied to the cathode 23 of the tube 22.

The plate circuit of the amplifier tube 22 comprises the positive or plus (+) B of the plate voltage supply, a conductor 28, a load resistor 29, a conductor 30, the anode 31 of the tube 22, the cathode 23 of the tube, and a conductor 32. The conductor 30 conductively connects the resistor 29 and the anode 31. The conductor 32 is connected to the cathode 23, to ground, and to the positive end of the voltage-divider 26.

A clipper circuit 33 is connected across the tube 22 for limiting the positive voltage swings on its anode 31. The limited output of the tube 22 is applied to the vertical deflecting electrodes or plates 34 of a cathode ray tube 35, the horizontal deflecting plates of which may be energized in any suitable manner for horizontal sweep of the beam of the cathode ray tube.

In order to provide suitable voltages for the suppressor and screen grids of the tube 22 and for the clipper circuit 33, a plurality of resistors 38, 39, 40, and 41, preferably adjustable and of substantially the same order of resistance-magnitude, are connected in series in a voltage-providing branch circuit 42 between the conductors 28 and 32. Preferably, the load resistor 29 has a resistance which is of a higher order of magnitude than that of the resistors 38 and 39 so that the deflecting plates 34 can be connected to the conductor 30 and a point 43 at an end of the resistor 39 of the branch circuit 42 for obtaining a measure of the limited output voltage of the amplifier tube 22.

The clipper circuit 33 comprises an electronic tube in the form of a diode 44 having its anode or plate-electrode 45 connected to the plate-conductor 30, and its cathode 46 connected to a point 47 at the end of the resistor 38 of the branch circuit 42. The clipper circuit is initially adjusted so that with no incoming or input signal, the diode 44 is just on the verge of conducting. This condition can be achieved in any suitable way, as by adjusting the biasing arm 25 in a direction that causes the plate current through the pentode tube 22 to decrease, so that the potential on the conductor 30 and the voltage across the deflecting plates 34 increase and cause the height of the vertical signal-trace on the screen of the cathode ray tube also to increase. The arm 25 is adjusted in this manner until the diode 44 begins to conduct and the clipper circuit 33 becomes effective to limit the output voltage of the tube 22. Thereafter, further adjustment of the arm 25 will not perceptibly raise the trace. The arm 25 can then be adjusted in the opposite direction until the trace on the screen of the cathode ray tube 35 begins to fall. The circuit is now in operating condition. Should the anode-voltage be increased thereafter, as, for example, by a drop in plate current, the diode 44 will become conducting and the clipper circuit will limit the anode voltage.

Operation

When there is no A. C. input signal, the potential-voltages at the grid 21 and anode 31 of the amplifier tube 22 are steady, as is the plate current through the plate-circuit of the tube. This steady-state condition is indicated by the substantially straight line curve-portions 52, 53, 54, and 55 of Figs. 2–5, respectively representing no signal input, a constant grid-voltage, a constant plate-current and a constant plate voltage.

Assume that the receiver 6 receives an A. C. signal that manifests itself across the arm 10 and terminal 8 as a sine-wave of a type shown by the curve-portion 62 on Fig. 2, representative of an A. C. input signal. Because of the rectifying action of the rectifier tube 13, only the negative excursions of the input signal are applied to the capacitor 20 and affect the steady-state voltage on the grid 21 of the tube 22. With the grid-bias voltage taken from the voltage divider 26 opposing and numerically less than the maximum amplitude of the input signal-voltage, the tendency of the negative signal-pulses to change the steady-state grid voltage is opposed by the flow of current through the leak resistor 24. The first negative signal-pulse and successive negative-signal pulses increase the grid voltage by increments, as indicated by the curve-portion 63 of Fig. 3. As shown in Fig. 2, the first half-cycle of the signal is positive, but the positive half-waves have no effect on the grid voltage because of the action of the rectifier tube 13. The second half-cycle of the signal is negative and initially lowers the grid voltage but finally raises it to the level $a$ of Fig. 3. The succeeding cycles of the signal repeat the process until the grid voltage finally reaches an equilibrium condition indicated by the curve-portion 73 of Fig. 3, in which the half-wave grid-voltage pulses are dips starting from and finishing at a line $b$ that is more positive than the steady state datum-line 53.

The plate current in the plate circuit of the tube 22 follows the grid voltage of the tube 22. This action is indicated in Fig. 4 wherein the curve-portion 64 represents the transition stage and the curve-portion 74 represents the equilibrium condition; the former corresponding in time to the curve-portion 63 and the latter to the curve-portion 73.

Because of the load resistor 29, the plate voltage of the tube 22 tends to rise when the plate current decreases and vice versa. However, because of the clipper circuit 33, adjusted as previously described, the plate voltage cannot rise above the steady-state value during the pulse-dips of the plate-current. But when the plate-current pulse is above the steady-state value, as at $c$ of curve-portion 64, the plate voltage is correspondingly lower.

Consequently, during the transition stage, the plate voltage tends to become lower, as indicated by the lines $d$ and $e$ of the curve-portion 65 of Fig. 5, until an equilibrium condition is reached having a lower average plate-voltage than the steady-state voltage represented by the datum-line 55. This equilibrium condition is indicated by the curve-portion 75 of Fig. 5. The plate voltage at equilibrium is effective on the deflecting plates 34 of the cathode ray tube 35 to change the height of the vertical trace on the screen of the tube 35, which represents the signal.

If the input signal is suddenly stopped, the grid voltage will drift back to the normal or steady-state condition as current flows through the leak resistor 24 for readjusting the voltage on the capacitor 20, and steady state conditions are restored.

If, after equilibrium for a predetermined input signal has been reached, the input signal should change then the electronic circuit will pass through a transition stage in which it will adjust itself to a corresponding new equilibrium which will be indicated by the vertical trace of the cathode ray tube 35.

The frequency of the pulse-waves in the various branches of the system is equal to that of the input wave-signal; but the time-period of a transition stage is dependent on the time-constant of the R–C circuit consisting essentially of the capacitor 20 and the leak resistor 24. Consequently, the electronic circuit ultimately provides an output wave-signal having a frequency equal to that of the input signal, but having an amplitude equal to the average amplitude of the input wave-signal over an immediately preceding interval of a length dependent upon the time-constant of the aforesaid R–C circuit.

In order to insure that a proper bias is on the rectifier diodes 12 and 13 so that full half cycles of the signal will be presented to the control grid of the tube 22, the resistors 15 and 16 are part of a potentiometer circuit, including the negative or minus (−) B connection of the high voltage supply.

The relative sizes of components of a specific embodiment of the invention can be gathered from the following resistance values of resistors therefor: 50000 ohms for the attenuator 9; 25000 ohms for the resistor 14; 2000 ohms for the resistor 15; 1600 ohms for the resistor 16; 25000 ohms for the resistor 18; 2.2 megs for the resistor 24; 100000 ohms for the resistor 26 with a voltage of about 6 volts across it; 40000 ohms for the resistor 29; and 2000, 4250, 2000, and 4000 ohms, respectively, across resistors 38, 39, 40, and 41 for a plus B voltage of about 300 volts.

Various modifications are contemplated and may obviously be resorted to by those skilled in the art without departing from the spirit and scope of the invention, as hereinafter defined by the appended claims, as only a preferred embodiment thereof has been disclosed.

What is claimed is:

1. An electronic circuit of a type described comprising, in combination, a pair of oppositely-connected half-wave rectifiers, means for connecting an input wave-signal to said rectifiers, means in the output of said rectifiers for eliminating by dissipation the rectified half-wave output of a first of said rectifiers, and circuit means including an R-C timing means connected to the output of the second of said rectifiers for obtaining an output signal providing an indication of an average amplitude of said input wave-signal.

2. An electronic circuit of a type described comprising, in combination, a pair of oppositely-connected half-wave rectifiers, means for connecting an input wave-signal to said rectifiers, means for eliminating by dissipation the rectified half-wave output of a first of said rectifiers, and circuit means including a timing means and a cathode-ray tube connected to the output of the second of said rectifiers for obtaining an output signal providing an indication of an average amplitude of said input wave-signal.

3. An electronic circuit of a type described comprising, in combination, a pair of oppositely-connected half-wave rectifiers, means for connecting an input wave-signal to said rectifiers, means for eliminating by dissipation the rectified half-wave output of a first of said rectifiers, and circuit means connected to the second of said rectifiers for obtaining an output signal providing an indication of an average amplitude of said input wave-signal, said circuit means comprising an R-C timing means, an electronic tube and a plate circuit therefor, and a cathode ray tube having a pair of deflecting electrodes connected to said plate circuit.

4. An electronic circuit as defined in claim 3 but further characterized by said plate-circuit comprising a load resistor.

5. An electronic circuit of a type described comprising, in combination, means for providing a voltage corresponding to an input wave-signal, a half-wave rectifier connected to said means, an electronic tube having a cathode, an anode and a control grid, a first circuit means for applying a potential to said grid, a second circuit means for modifying said potential in accordance with the output of said rectifier, said first and second circuit means comprising a time-constant circuit, a plate circuit for said tube, and a clipper circuit connected to said plate circuit for limiting the voltage on said anode.

6. An electronic circuit of a type described comprising, in combination, means for providing a voltage corresponding to an input wave-signal, a half-wave rectifier connected to said means, an electronic tube having a cathode, an anode and a control grid, a first circuit means for applying a potential to said grid, a second circuit means for modifying said potential in accordance with the output of said rectifier, said first and second circuit means comprising a time-constant circuit, a plate circuit for said tube for limiting the voltage across said tube, said plate circuit including said anode and a load resistor conductively connected to said anode, an electronic tube comprising a plate-electrode, and means connecting the last said tube to said plate circuit with said plate-electrode connected to a point between said anode and said load resistor.

7. An electronic circuit of a type described comprising, in combination, means for providing a voltage corresponding to an input wave-signal, a half-wave rectifier connected to said means, an electronic tube having a cathode, an anode and a control grid, a first circuit means for applying a potential to said grid, a second circuit means for modifying said potential in accordance with the output of said rectifier, said first and second circuit means comprising a time-constant circuit, a plate circuit for said tube for limiting the voltage across said tube, said plate circuit including said anode, a load resistor, and a conductor conductively connecting said load resistor to said anode, an electronic tube comprising a plate-electrode, means connecting the last said tube into said plate circuit with said plate-electrode connected to said conductor, and a cathode ray tube having a pair of deflecting electrodes connected to said plate circuit with one of said deflecting electrodes connected to said conductor.

8. An electronic circuit of a type described comprising, in combination, an electronic tube having a cathode, an anode and a control grid, a plate circuit for said tube including said anode and a load resistor, a clipper circuit connected to said plate circuit for limiting the voltage between said anode and cathode, an indicating means connected to said plate circuit, and timing means for potentializing said grid with pulses corresponding to a measure of an input signal to said electronic circuit.

9. An electronic circuit as defined in claim 8 but further characterized by said indicating means comprising a cathode ray tube.

10. An electronic circuit of a type described comprising in combination, an electronic tube having a cathode, an anode and a control grid, a plate circuit for said tube including said anode and a load resistor, a clipper circuit connected to said plate circuit for limiting the voltage between said anode and cathode, an indicating means connected to said plate circuit, an R-C timing circuit for said tube including a biasing means comprising a leak resistor for applying a predetermined negative bias on said control grid, said leak resistor being connected to said grid, a second biasing means comprising a capacitor for superimposing a signal bias on said control grid, and means for providing negative signal pulses to said second biasing means.

11. An electronic circuit as defined in claim 10 but further characterized by said indicating means comprising a cathode ray tube.

12. An electronic circuit as defined in claim 10 but further characterized by said plate circuit comprising a conductor conductively connecting said load resistor and anode, and said clipper circuit comprising a diode having an anode connected to said conductor.

13. An electronic circuit as defined in claim 12 but further characterized by said indicating means comprising a cathode ray tube having a deflecting electrode connected to said conductor.

14. An electronic circuit of a type described comprising, in combination, a pair of oppositely-connected half-wave rectifiers, means for applying a wave-type signal to said rectifiers, output means connected to said rectifiers for obtaining half loops of said input signal having a mean potential dependent on said input signal, electronic tube means, a timer circuit including a capacitor and resistor connected between said output means and said tube means for applying said half waves to said electronic tube means after introducing a time delay into the adjustment of the mean potential of said half loops to a change in the level of said signal input, said electronic tube means comprising means for providing an output circuit and a cut-off potential therefor, and a cathode ray tube connected to said output circuit for displaying an output signal of said output circuit.

References Cited in the file of this patent

UNITED STATES PATENTS

| | | |
|---|---|---|
| 2,059,004 | Leeds | Oct. 27, 1936 |
| 2,265,883 | Applegarth | Dec. 9, 1941 |
| 2,339,536 | Wendt | Jan. 18, 1944 |
| 2,358,545 | Wendt | Sept. 19, 1944 |
| 2,391,082 | Beste | Dec. 18, 1945 |
| 2,471,246 | Smith | May 24, 1949 |